INVENTORS.
ROBERT B. TAYLOR
ROBERT G. WALKER
BY
*Albert L. Jeffers*
ATTORNEY

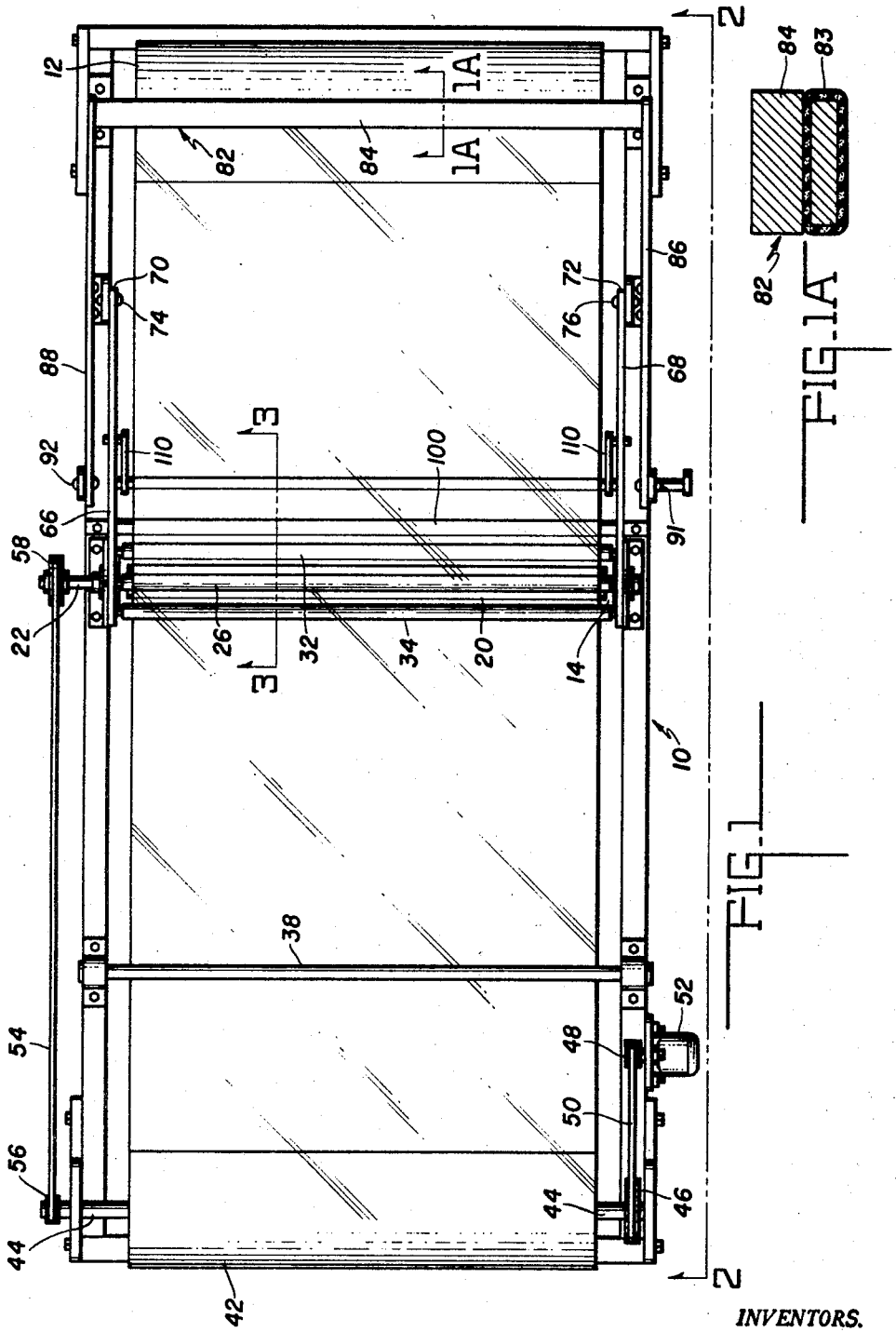

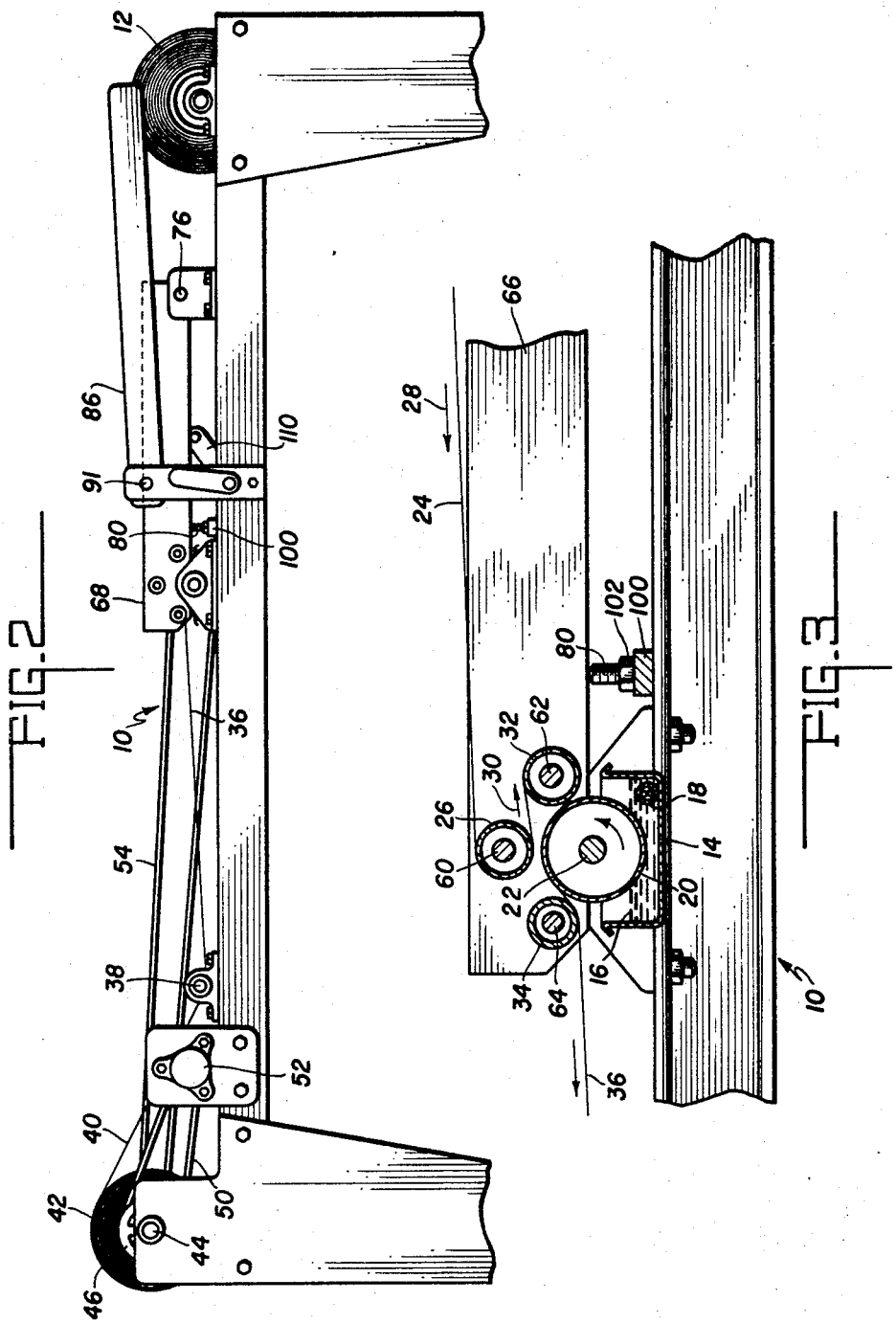

3,436,232
PROCESS FOR STORING UNCOOKED DOUGH MODELS AND PACKAGE
Robert B. Taylor, 1009 W. Berry St. 46804, and Robert G. Walker, 4217 Buell Drive 46807, both of Fort Wayne, Ind.
Filed June 9, 1965, Ser. No. 462,506
Int. Cl. B65b *25/16*
U.S. Cl. 99—172                                   5 Claims

ABSTRACT OF THE DISCLOSURE

A number of uncooked dough models are sized and hermetically sealed within a package formed by fusing two sheets of impervious material with inner surfaces coated with .0015 to .001 inch of paraffin. The package is frozen. The dough is defrosted and proofed while still within the package.

---

This invention relates to an improved process to an apparatus and article used in a process for producing cooked articles from uncooked dough without substantial change to the dough so that its quality and shape are substantially unaffected by storage.

The cooking arts have long been interested in obtaining an improved article which can store and contain uncooked dough until the time of cooking, prior to serving. Many desirable recipes can be embodied in uncooked dough and the consumer is able to realize the skill in combining the ingredients and method of processing if it is possible to preserve the uncooked dough without change in flavor or nutrition during the time that it is stored. The best method of storage conceived thus far in the art is to freeze the dough after it is sealed in the package, and in this way the dough will preserve much of its original value and without substantially varying as a starting material for producing a food article such as a doughnut, roll, cruller, etc.

There has been proposed gas and moisture impervious sheet material for constructing a container for receiving the uncooked dough. Typically, these materials are polyethylene, vinylidene-vinyl copolymer, polypropylene, polyethylene terphthalate, and other such similar materials. It has been found, however, that such materials will tend to stick to the dough, and will cause the dough models to be torn when they are unpackaged. For this reason, the gaseous-impervious materials have not been as extensively used as their physical properties would indicate. It forms an important feature of the present invention that we can produce a container formed from such impervious materials but without damage to the uncooked dough, and this discovery is based upon use of a carefully dimensioned coating of paraffin which is present in the range of about .0015 to about .001 inch.

It is one of the important objects of the present invention to provide both apparatus and process for producing a carefully dimensioned coating of paraffin such as petroleum paraffin on a sheet of stock material and that such process and apparatus can be employed to produce substantial quantities of the coated stock.

It is a further object of the present invention to provide a process for storing and processing uncooked dough in which the dough can be stored without substantial diminution of the value of the dough in producing a cooked article, said process providing for both defrosting and proofing (regardless of the order) while the dough is contained within a completely sealed container thereby insuring the proper atmosphere which is suited for the defrosting and profing operations.

It is an important feature of the present invention to provide a properly processed article of dough for cooking which has been previously stored in frozen condition and without significant loss of food value or taste value as a starting material and which can be removed from its storage container without damage and after defrosting for final cooking at the approximate time of serving.

It is one of the objects of the present invention to make it possible for one unskilled in the art to produce a quality pastry such as a doughnut, by combining into the product all of the quality and skill of formulating, conditioning, etc., up to the point of baking or frying so that a relatively unskilled processor can produce a quality product after mastering the relatively simple step of cooking the product which is delivered to him in a condition ready for defrosting and then cooking.

It is a further object of the present invention to provide a process in which substantial quantities of dough can be prepared and frozen, ready for cooking as the needs require, by building an inventory of products that are frozen and ready for cooking in accordance with the schedule of demand. This way greater flexibility of manufacture is permitted to meet unexpected demand, the previously prepared dough being ready for immediate, or substantially immediate, baking or frying so that it is fresh at the time of use.

Other objects and features of the present invention will become apparent from a consideration of the following description which proceeds with reference to the accompanying drawings, wherein:

FIGURE 1 is a top view of the apparatus for producing laminated sheet stock used in fabricating the container;

FIGURE 1A is a section view taken on line 1A—1A of FIGURE 1;

FIGURE 2 is a side view of the apparatus looking in the direction of the arrows 2—2 in FIGURE 1;

FIGURE 3 is an enlarged detail view of the applicator roll and tray, taken on line 3—3 of FIGURE 1;

Figure 4:
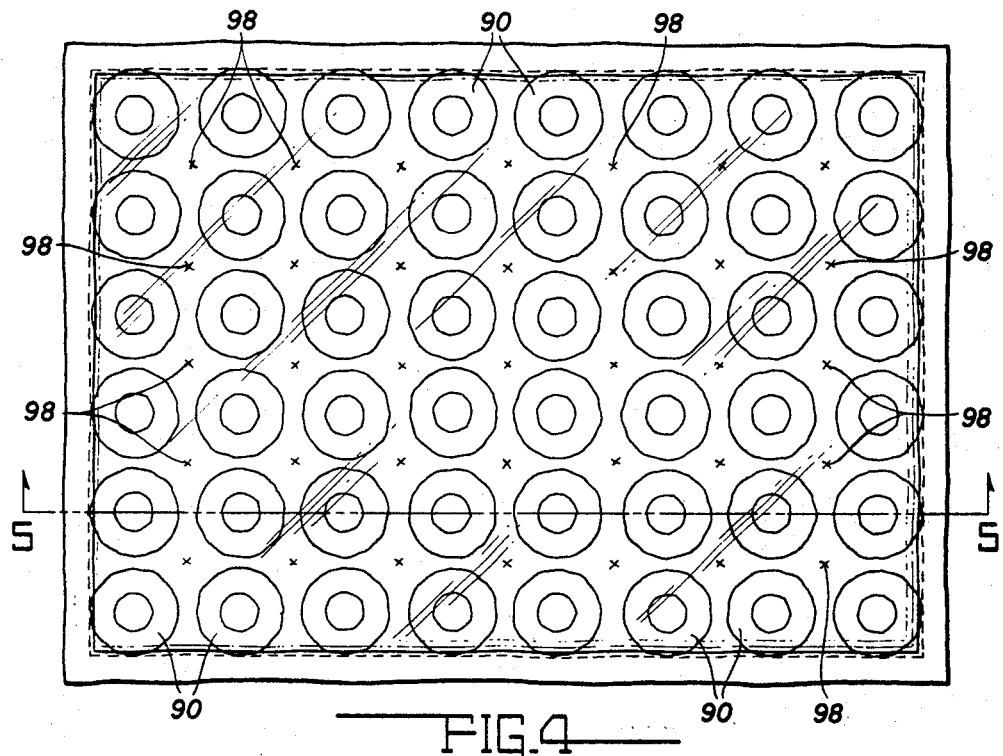
FIGURE 4 is a top view of the package of prepared, uncooked dough which is maintained in a frozen condition prior to thawing, proofing, and cooking.

Referring now to the drawings, the apparatus which is designated generally by reference numeral 10 includes a supply roll 12 of flexible gas-and-moisture impervious sheet material such as polyethylene. In addition to polyethylene, which has a suitable degree of impermeability, other plastic compositions may also be used, such as polymethylene methacrylate, polypropylene, polyethylene terphthalate and vinylidene-vinyl copolymer sometimes referred to as "Saran." These described materials, while possessing the necessary impervious quality, tend to adhere to the raw dough which is the material for making a doughnut and, therefore, it is necessary to condition these plastic materials so that they will not so adhere. It is the purpose of the apparatus 10 to apply a thin controllable thickness of paraffin onto the surface which is intended for engagement with the dough which will release from the dough and will not destroy the models of dough when they are taken out for cooking. The apparatus 10 includes a tray 14 containing a quantity of paraffin 16 which is maintained in liquid state and at a desired temperature by a suitable heating element 18. An applicator roll 20, which is mounted on a shaft 22, dips into the paraffin 16 and a coating of paraffin adheres to the roll 20 as it rotates out of the bath. The plastic sheet 24 (FIGURE 3) is passed over an idler roll 26 and is reversed in direction from the direction of the arrow 28 to the direction of the arrow 30, and is then passed over a second idler roll 32, and then over the applicator roll 20 where it has engagement with the applicator roll 20.

After leaving the applicator roll 20 the paraffin coated sheet 24 is passed under an idler roll 34 which engages the uncoated surface and extends for a substantial span 36 (FIGURE 2) which allows time for the paraffin layer to cool. The sheet is next passed under an idler roll 38 and then after extending through span 40 is wound onto a windup roll 42 which is driven on the shaft 44 (FIGURES 1 and 2) by a pulley wheel 46 which is coupled with drive wheel 48 through a belt 50, the power or drive wheel 48 being actuated by a motor 52. The rate of rotation of applicator roll 20 and the windup roll 42 are coordinated by gearing the windup roll 42 with the applicator roll 20 through a belt 54 which interconnects pulleys 56, 58 (FIGURE 1), mounted on the ends of shafts 44 and 22 respectively. The applicator roll must turn constantly because it supplies the paraffin, but the rotation is not necessarily coordinated with the windup roll. The windup roll determines the rate of production of the apparatus because it pulls the plastic sheet from the supply roll 12 through the apparatus.

It has been found that the thickness of the paraffin is of importance. If there is insufficient paraffin in the order of substantially less than .001 of an inch, then the coating will be inadequate and the product will have a tendency to stick to the plastic sheet. On the other hand, if the paraffin builds up to too great an amount, i.e., substantially more than .0015 of an inch it will tend to crack and tend to be removed from the sheet. It is, of course, essential that the coated sheet be flexible in order to provide a smooth coating.

The thickness of the paraffin coating is determined by the position of the roll 32 in relation to the applicator roll 20, the idler roll 32 and 34 being adjustably rotatably mounted on corresponding shafts 62 and 64 on levers 66 and 68 (FIGURE 1), the lever 60 being pivoted at its end 70, on pin 74. The tension of the film against the applicator roll 20 also affects the thickness of the coating. By adjusting the levers 66, 68 downwardly, i.e., counter-clockwise about their mountings (FIGURE 2) the pressure of engagement will be increased, and this will decrease the thickness of the paraffin coating on the sheet 24. The coating of paraffin is increased in thickness by positioning the roll 32 by raising the lever 66. The degree of thickness is adjustably obtained by suitably positioning the lever 66 through a set screw 80 (FIGURE 3) which can be screwed up and down to raise and lower the lever 66 and thereby control the paraffin thickness to the desired thickness.

To achieve uniformity in the coating of the paraffin on the sheet 24, it is necessary to maintain tension on the sheet, and the degree of tension is controllable by means of engaging a holding means such as a friction stop 82 against the periphery of the roll 12 frictionally impeding its unrolling movement so that the drawing force of the windup roll 42 will increase tension on the sheet causing it to be drawn taut and smooth.

The brake 82 is in the form of a friction pad 83 or the like, which is disposed at the undersurface of crossbar 84 (FIGURE 1A) which is held at its opposite ends by pivot arms 86, 88, mounted on pivots 91 and 92 respectively. The pad 83 can be forced downwardly to increase friction engagement and correspondingly increase tension on the plastic sheet 24, or, frictional engagement can be decreased and tension correspondingly decreased. It has been found that in the absence of this controlled tension the coating of paraffin will tend to be non-uniformly applied from edge to edge of the continuous length plastic material.

It is, of course, within the teaching of the present invention to use a controllable or adjustable tensioning means and such tensioning means can be regulated to provide the necessary tension for effecting uniform application of paraffin.

In use, the paraffin coated plastic sheet is cut to a prescribed size and the uncooked dough models 90 (FIGURE 4), in whatever number is desired, are placed on one sheet of the material in contact with the paraffin coated side. A second sheet with the coated side downward, is then overlayed on the models 90 and the edges of the two sheets are fused together to hermetically seal the enclosure formed by the two sheets. It should be noted that the edges of the two sheets are fused together and the paraffin does not interfere or prevent the sealing of the two sheets. The product 90 is thus maintained in a controlled atmosphere and it has been found that this atmosphere is suitable to freezing and storing the product of uncooked dough. The uncooked dough models are then frozen to inhibit fermentation of the dough. The product is then stored in a freezer at a substantially constant temperature in order to prevent dehydration and spoilage of the dough and is defrosted and proofed as needed before being cooked. While it is preferred to freeze the uncooked dough models before they are proofed it has become desirable in some instances to partially proof the uncooked dough models prior to freezing. Thus by partial proofing of the dough models prior to freezing reduces the time required for complete proofing of the dough models prior to the cooking operation.

Figure 5:
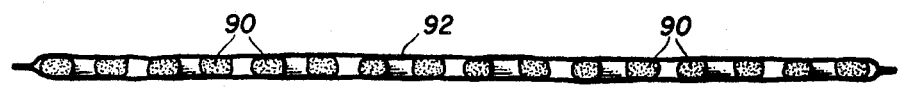
FIGURE 5 is a section view taken on line 5—5 of FIGURE 4.
Figure 6:
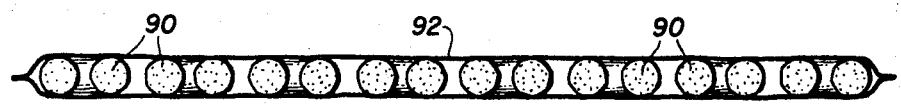
FIGURE 6 is a view similar to that of FIGURE 5 after proofing of the dough in which the fermentation has taken place.

In some instances it may be desirable to proof in warm water which will expedite the raising of the dough. It has been found that an improved proofing occurs within the completely sealed enclosure 92 (FIGURE 5) because of the optimum conditions of moisture which permit the dough to produce a fluffier construction more uniform in texture, size and cross section. After the proofing occurs, enclosure 92 expands from the shape of FIGURE 5 to that of FIGURE 6 and it has been found that the swelling or raising of the dough occurs more uniformly, and less sensitively than the same dough outside the completely sealed enclosure.

One ordinarily skilled in the art can easily be taught to perform the cooking operation for the raised dough. The present invention proposes to place in the hands of those having ordinary skill in the art a previously prepared pastry dough which embodies all of the skill of formulating and processing necessary to produce a product of excellent taste and of freshly cooked quality. All that the unskilled, or ordinarily skilled individual needs to do is to defrost and remove the raised product and then place it in a vat of cooking oil (not shown) or insert it in a bake oven (not shown), and a superior product will be produced.

The cooking operation can be performed either by batch process or by a continuous process. In any event, substantial quantities of uncooked dough can be purchased and shipped from the processor to the point of cooking and consumption.

Regardless of the volume of cooking the finished product is of the same high degree of quality and embodies the built-in skill of dough formulation and processing and requires only the final step of cooking on the part of the user. Because the dough is in a frozen condition, it can be safely shipped and stored, the only requirement being that storage temperature is relatively uniformly held at or below 0° degrees Fahrenheit.

Any paraffin which has adhered to the raw dough will be dissipated during cooking because its vapor pressure at the cooking temperature will cause it to dissipate. The paraffin coating on the plastic sheet serves its function in providing ready release from the dough when the enclosure sheets are peeled away.

If it is desired to, in order to maintain the spacing of the dough models in FIGURE 4, the two sheets can be spot welded together at various locations, as indicated by reference numeral 98. This way the raw dough models are isolated from each other and will not come into contact with each other. In a still further application of the invention, separators can be employed, if desired, to maintain the relative spacing of the models.

In the operation of producing the plastic sheet for packaging the raw dough models, the levers 66, 68, are pivoted on thier ends 70, 72, about pivots 74 and 76, causing the sheet 24 to press against the coating roll 20 which is driven together with the windup roll 42 through the belt 54. The levers 66, 68 are quite heavy, and produce the desired degree of applying force on the sheet 24 depending upon their angular position as defined by the set screws 80 which are threaded into mounting plates 100 (FIGURE 3) and are held in that position by nuts 102.

The tension of the sheet 24 affects the thickness of the coating of paraffin 16 which, as previously mentioned, should be in the range of about one to one-and-a-half thousandths inches for optimum results. When the levers 66, 68 are not in use they are raised and held in a raised position by linkages 110 (FIGURES 1 and 2).

The thickness of the paraffin coating is also controlled adjustably by positioning the roll 32 with respect to the applicator roll 20, and by maintaining a relatively constant temperature of the paraffin 16 through a suitable heating element 18. The sheet is drawn continuously through the apparatus by the windup roll 42.

The described operation of the apparatus 10 produces a suitably uniform product suitable for packaging, storing and processing the dough for its eventual use and completely seals the dough at a high quality condition in a frozen state and provides the best environment for defrosting and proofing before cooking.

Although the present invention has been illustrated and described in connection with a plurality of example embodiments, it will be understood that these are illustrative of the invention and are by no means restrictive thereof. It is reasonably to be expected that those skilled in this art can make numerous revisions and adaptations of the invention, and it is intended that such revisions and adaptations will be included within the scope of the following claims as equivalents of the invention.

We claim:

1. A package of frozen sized dough models intended for cooking after being defrosted from storage in a frozen state, comprising first and second superposed sheets of moisture and gas impervious material, a plurality of sized dough models disposed in spaced apart and individual relation between the sheets and resting on the first sheet with the second sheet overlying them, each sheet having a thin coating of paraffin in a range of about .0015 to .001 inch on the surface in contact with the dough models, said sheets being dimensioned so that they have meeting complemental edges, said edges being sealed tightly together about the dough models so as to form a hermetically sealed enclosure container for the dough models, and said sheets being dimensioned and flexible so that the enclosure container is expandable to increase the volumetric capacity of the enclosure container during proofing of the uncooked dough models therein and the internal atmosphere in the enclosure container remaining substantially the same during freezing, storing, defrosting and proofing of the packaged dough models, whereby the moisture content of the dough models remains substantially the same throughout all stages.

2. A process for storing uncooked dough models in a completely sealed package for preserving and packaging purposes, comprising the steps of: sizing a plurality of dough models, placing the dough models in spaced apart locations on a first sheet of moisture and gas impervious material having a thin coating of paraffin in a range of about .0015 to .001 inch on the surface in contact with the dough models, overlaying the dough models with a second sheet of moisture and gas impervious material having said thin coating of paraffin on the surface in contact with the dough models, sealing the sheets at their adjoining edges to form a hermetically sealed, expandable package, freezing the dough models to inhibit fermentation, storing the package with the frozen dough models at a sub-freezing temperature to preserve the dough models in a substantially unchanged condition, and thereafter defrosting and proofing the uncooked dough models while they are within said hermetically sealed package.

3. A process for storing uncooked dough models in a completely sealed package for preserving and packaging purposes, comprising the steps of: sizing a plurality of dough models, placing the dough models in spaced apart locations on a first sheet of moisture and gas impervious material, overlaying the dough models with a second sheet of moisture and gas impervious material having a thin coating of paraffin in the range of about .0015 to .001 inch on the surface in contact with the dough models, sealing the sheets at their adjoining edges to form a hermetically sealed, expandable package having a controlled atmosphere therein, freezing the dough models to inhibit fermentation, storing the package with the frozen dough models at a sub-freezing temperature to preserve the dough models in a substantially unchanged condition, and thereafter defrosting and proofing the uncooked dough models while they are within the hermetically sealed package so that the atmosphere is substantially unchanged from the atmosphere during packaging, whereby the moisture content remains substantially the same.

4. A process for storing uncooked dough models in a completely sealed package for preserving and packaging purposes as set forth in claim 3 wherein the package is placed in warm water to accelerate the raising of the dough in proofing.

5. A process for storing uncooked dough models in a completely sealed package for preserving and packaging purposes, comprising the steps of: sizing a plurality of dough models, placing the dough models in spaced apart locations on a first sheet of moisture and gas impervious material having a thin coating of paraffin in the range of about .0015 to .001 inch on the surface in contact with the dough models, overlaying the dough models with a second sheet of moisture and gas impervious material, sealing the sheets at their adjoining edges to form a hermetically sealed expandable package having a controlled atmosphere therein, partially proofing the uncooked dough models within the hermetically sealed package, freezing the dough models to inhibit fermentation, storing the package with the frozen dough models at a sub-freezing temperature to preserve the dough models in a substantially unchanged condition, defrosting and completing the proofing of the uncooked dough models while they are within the hermetically sealed package, and thereafter removing the proofed dough models for cooking operation.

References Cited

UNITED STATES PATENTS

| 2,984,585 | 5/1961 | Sherman | 117—76 |
| 1,861,124 | 5/1932 | Lorber | 99—172 |
| 1,873,716 | 8/1932 | Nickerson | 99—172 |
| 3,212,903 | 10/1965 | Oberholtzer | 99—90 |

FOREIGN PATENTS

| 953,523 | 3/1964 | Great Britain. |

A. LOUIS MONACELL, *Primary Examiner.*

S. B. DAVIS, *Assistant Examiner.*

U.S. Cl. X.R.

99—171, 192